Feb. 3, 1925.                                              1,525,018
E. H. ALLEN
MACHINE FOR SOAKING SUBSTANCES IN LIQUIDS
Filed Jan. 2, 1924
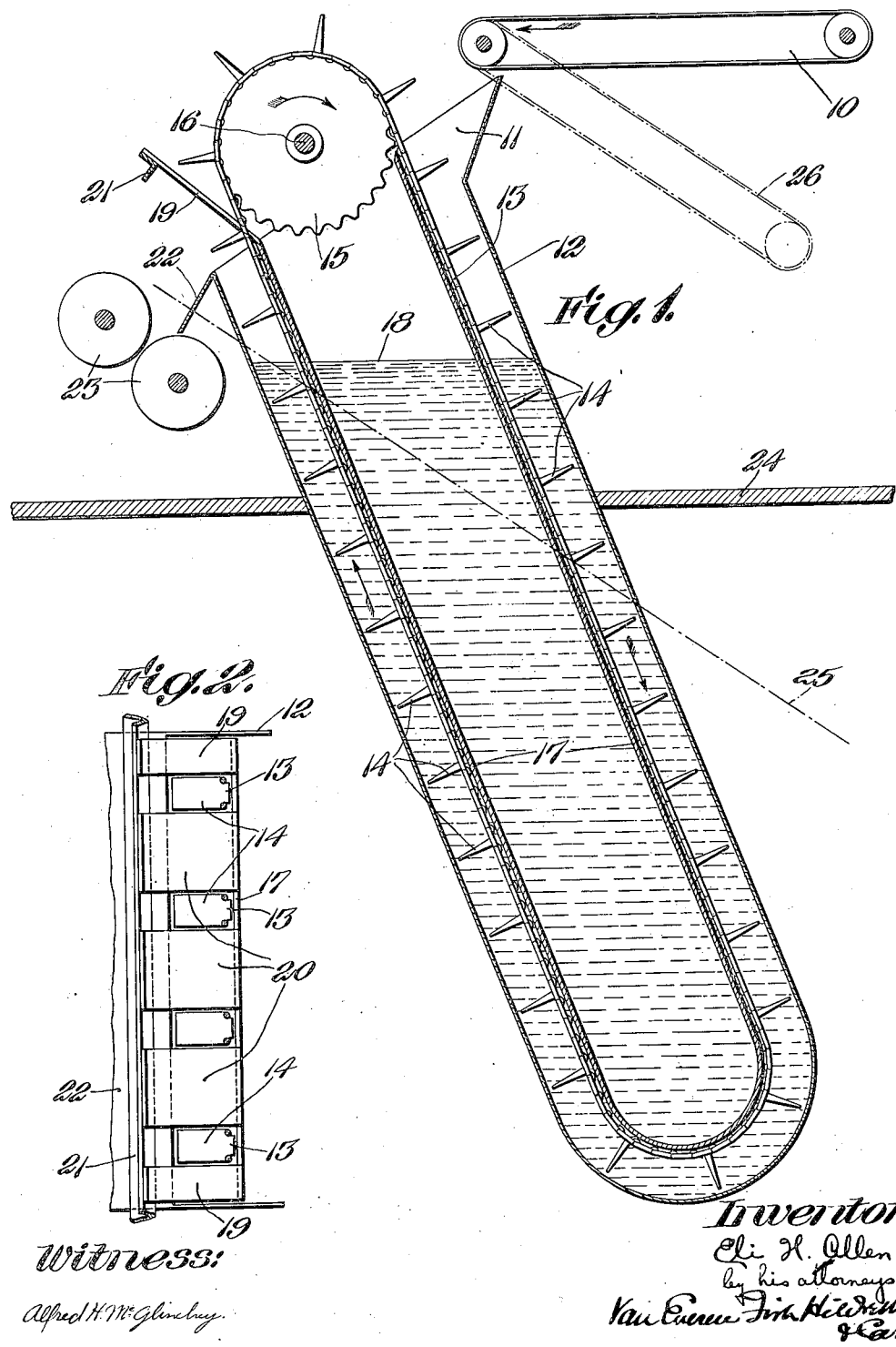

Patented Feb. 3, 1925.

1,525,018

UNITED STATES PATENT OFFICE.

ELI H. ALLEN, OF MELROSE HIGHLANDS, MASSACHUSETTS.

MACHINE FOR SOAKING SUBSTANCES IN LIQUIDS.

Application filed January 2, 1924. Serial No. 684,093.

*To all whom it may concern:*

Be it known that I, ELI H. ALLEN, a citizen of the United States, residing at Melrose Highlands, in the county of Middlesex and State of Massachusetts, have invented certain new and useful Improvements in Machines for Soaking Substances in Liquids; and I do hereby declare the following to be a full, clear, and exact description of the invention, such as will enable others skilled in the art to which it appertains to make and use the same.

The present invention relates to a machine for soaking substances in liquids.

The object of the invention is to produce a machine for soaking substances in liquids having provision for immersing the substances in the liquids and removing them therefrom in a continuous manner. The invention consists in the improvement hereinafter described and particularly defined in the claims.

In the accompanying drawings illustrating the preferred form of the invention, Fig. 1 is a vertical, sectional elevation of the machine; and Fig. 2 is a detail hereinafter described.

The illustrated embodiment of the invention is particularly intended for soaking woolen and cotton rags in acid for the purpose of destroying the cotton fibre and recovering the woolen fibre for reuse in manufacturing woolen goods. It is important in treating material of this sort that the immersion in the acid be of short duration so that the action of the acid is limited to the cotton and efficient because so limited, for if it were immersed a greater length of time a greater consumption of acid would be incident thereto, or the wool would be damaged.

Rags to be treated are thrown on the feed apron 10 by which they are conveyed to the immersing apparatus and discharged into a hopper 11. This hopper 11 is the lipped mouth of an elongated immersion tank 12; its width is shown in Fig. 2. A series of four chains 13 provided with spikes 14 carry the rags down into the liquid contained in the immersion tank 12. The chains 13 are carried by a series of sprocket wheels 15 mounted on the shaft 16. Any suitable power connections afford means for driving the chains. The chains are supported on an internal chain guiding drum 17, which is merely a chain support and extends from side to side of the casing of the immersion tank and on it the chains rest and by it the chains are guided in their movement through the immersion tank. The rate of speed at which the chains are driven determines the duration of immersion of the rags in the acid. Thus, if it were ascertained that an immersion in the acid of a period of 32 seconds were required in order to secure the desired destruction of the cotton fibre, the speed of the chains would be made such that from the time the rags were submerged below the surface of the acid at 18 to the time when the rags emerged from the acid would be precisely 32 seconds. Any longer immersion would be wasteful and any shorter immersion would be insufficient to accomplish the purposes desired. Nice adjustment of the length of time of immersion may be secured by raising or lowering the level of the acid.

The rags, it will be observed, are carried down on the right hand side and raised up on the left hand side. When the rags are raised to the discharge position they are stripped from the chains by the strippers 19, 20, which constitute extensions of the internal chain guide drum 17, which extend outwardly between the chains as shown in Fig. 2, the ends of the guides being attached to the angle bar 21, which constitutes a support for the guides and the internal chain guiding drum. When the rags are thrown out of the immersion tank they fall upon the guide member 22 and are guided to squeeze rolls 23 between which they pass and which remove a large part of the acid therefrom. The rags are now sent along in the ordinary course of shoddy recovery and receive the usual treatment.

The invention resides in the immersion apparatus. It is not limited to a use in connection with the acid treatment of rags for the purpose of destroying cotton fibres in rags. It may be used for any purpose where it is desired to immerse substances in a liquid and to remove them therefrom after such immersions, and particularly where the immersion is of comparatively short duration. Thus, the apparatus is adapted for creosoting shingles.

One of the important features of the machine resides in carrying the rags to such depth in the liquor by which they are to be treated as to produce a sufficient pressure due to the depth of the liquid to cause the liquid to penetrate the rags and the fibre of which the rags are composed. Thus, with a tank in which the rags are carried to a depth of 20 feet below the level of the liquid, a pressure of approximately 10 pounds on the rags will be secured. In this connection it is to be observed that in some cases and for some uses a greater pressure is required than for others; in cases where a greater pressure is required, the angle of the immersion tank will be more nearly vertical, while in cases where a less pressure is desired the angle will be more nearly horizontal. The floor line 24 of the illustrated embodiment is the floor line for immersion where certain pressure on the fibre is required. By changing the angle of the floor line to that indicated at 25 a less pressure of the liquid on the fibre will be obtained.

Furthermore, it is preferred to arrange the apparatus so that the substances being treated are carried down at an incline for convenience of feeding the material to the immersion tank and carrying it through the tank, as it has been found that angular arrangement conduces to a satisfactory operation of the apparatus. In case the floor line 25 were used, the feed portion 10 would be arranged in the position indicated at 26 parallel to the floor line.

Having thus described the invention, what is claimed is:

1. A machine for soaking substances in liquids having, in combination, a tank arranged at an angle to the vertical and adapted to contain a treating liquid, an endless chain extending from a point above the level of the liquid and down into the liquid and back again, means for driving the chain, and means for supporting the chain a substantially uniform distance from the walls of the tank.

2. A machine for soaking substances in liquids having, in combination, an immersion tank, an endless chain for carrying substances down into and through the liquid contained in the tank, and strippers for stripping the substances from the chains at the discharge side of the tank.

3. A machine for soaking substances in liquids having, in combination, an immersion tank adapted to contain a treating liquid, an endless chain extending into the liquid, means for actuating the chain, and a chain guide for guiding the chain in its passage through the liquid.

ELI H. ALLEN.